Aug. 12, 1924.

M. HÖCHSTÄDTER 1,504,691

SAFETY SYSTEM FOR ELECTRIC NETWORKS

Filed Sept. 7, 1921

Inventor
Martin Höchstädter
by Knight Bros
Attorneys

Patented Aug. 12, 1924.

1,504,691

UNITED STATES PATENT OFFICE.

MARTIN HÖCHSTÄDTER, OF THE HAGUE, NETHERLANDS, ASSIGNOR TO N. V. LIJN-PROTECTIE, OF THE HAGUE, NETHERLANDS.

SAFETY SYSTEM FOR ELECTRIC NETWORKS.

Application filed September 7, 1921. Serial No. 499,054.

*To all whom it may concern:*

Be it known that I, MARTIN HÖCHSTÄDTER, a citizen of the German Empire, and residing at 157 Stationsweg, The Hague, Netherlands, have invented certain new and useful Improvements in and Relating to Safety Systems for Electric Networks, of which the following is a specification.

In the case of safety systems with subdivided conductors in parallel—hereinafter called parallel or branch conductors—for the automatic cutting out of faulty sections of the line, it is desirable in normal working automatically to produce a certain difference of potential between the conductors of a section of the line. It is generally required that the proportion of the currents in the parallel conductors should remain approximately constant in normal working, that is, at all loads, when the section of the line is in order, in spite of this auxiliary voltage and the apparatus introduced for producing it.

Such safety systems and the methods for producing the auxiliary voltage are known in principle, and are disclosed for instance in the British Patents Nos. 21992/14 and 22045/14 granted to me.

It may, however, be proved theoretically and by experiment, that in practice the accurate balancing, such as is described in aforesaid patents, becomes the worse the more similar the cross-sections of the two conductors are. It even becomes theoretically impossible when the conductors have exactly the same cross-section.

The present invention is intended to supply this want, that is, it relates to an accurate balancing of current for subdivided conductors which are approximately or entirely alike.

For producing the auxiliary voltage between the parallel conductors, transformers are used which are connected to the ends of the section of the line and are provided with windings through one of which in each case one of the branch currents flows.

In the present invention the two transformers of a section of the line are wound and connected up in such a manner that the windings of each transformer magnetize its iron core in the opposite sense and that the ratio of transformation of one transformer is smaller and that of the other is greater than the ratio of impedances of the two conductor branches.

The exact number of windings for the two transformers may be calculated beforehand for certain given conditions of current and voltage. The ratio of transformation of the transformers is taken as the ratio of the number of windings connected in one conductor branch to the number of windings connected in the other conductor branch.

By this arrangement a perfect balance is obtained, such that the current ratio between the two conductor branches is practically constant for any load and that the magnetic conditions (magnetic induction) of the two transformers are alike.

At the same time by this arrangement the phase displacement and the distortion of the two branch currents relatively to each other is obviated.

In the accompanying drawings,

Figure 1 shows diagrammatically connections for a section of a line with two parallel conductors.

Figure 2 shows the voltage diagram for this section of a line, the ohmic loss of voltage being ignored.

Figure 1:
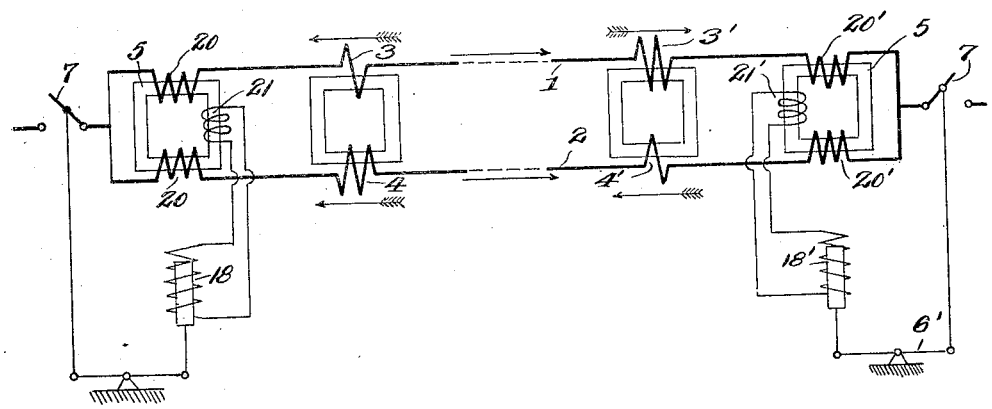
Figures 1 and 2 show how the invention may be carried out and operated.

In Figure 1 the conductor is subdivided into the two branch conductors 1 and 2, which are connected at their ends through the windings 3, 4 and 3', 4' of the two transformers and over the cut-out relays 5 and 5' at the ends of the section of the line and are connected to the section switches 7 and 7'. The relays 5 and 5' are in this case assumed to be differential relays, which operate the oil switches 7 and 7' in a known manner by mechanical or electrical means or both.

In Figure 1 they are assumed to be of the three-winding construction mounted on an iron core 5, one of the windings 20 being inserted in each branch conductor, the third one 21 being connected to a tripping coil 18, which in turn by known means, i. e. by a mechanical gear 5, operates the oil switches 7. The other end of the line section has a similarly constructed relay with corresponding elements 5', 20', 21', 18', 6'.

The direction of the current at a given moment is indicated by ordinary arrows and the direction of the counter voltages produced at the ends of the section of the line by the windings of the two transformers by feathered arrows.

If the iron cores of the two transformers be assumed to be alike, which is most convenient in practice, the arrangement is substantially symmetrical with respect to the two transformers of a section, that is, the total number of turns of each transformer (primary and secondary together) is the same.

For equal cross-sections of the partial conductors, for instance, a possible and favourable solution is obtained, if the four numbers of turns, as shown in Figure 1, are taken as follows: windings $3:3':4':4=1:2:1:2$ turns.

If the windings of the transformers are thus calculated to give exact balance, the ratio of the currents in the parallel conductors 1 and 2 is not effected by the transformers and the branch currents are only determined by the respective impedances of the branch conductors, at all loads.

Figure 2:
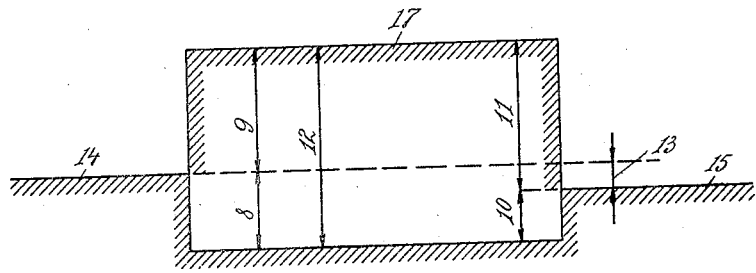

The voltage diagram of a section of the line, which is shown in Figure 2, takes no account of the voltage drop in the branch conductors themselves. If it be taken into account all the horizontal lines would be slightly inclined.

In the diagram 14 and 15 represent the potentials of the two ends of the section of the line, 16 the potential of the conductor 1 between the transformers, 17 the potential of the conductor 2 between the transformers, 8 the voltage at the winding 3, 9 the voltage at the winding 4, 10 the voltage at the winding 3', and 11 the voltage at the winding 4'. The constant voltage between the conductors 1 and 2 along the section is represented by 12 and the voltage drop in the section of the line due to the transformers is indicated by 13.

It will be seen that the loss of voltage for the magnetization of the transformers in the section of the line amounts to only a fraction of the auxiliary voltage 12, produced by these transformers between branch conductors 1 and 2.

The arrangement acts in the following manner: When the section of the line is in normal working condition, normal currents will flow through the windings of each relay 5 and 5', which are adjusted in proportion to the said currents and, being not magnetized, therefore remain inactive. In the case of a fault the balance indicated by the diogram in Figure 2 will be fundamentally changed as the relative tension of the transformers is fundamentally changed, due to a leakage occurring in one branch conductor, or in case the two branch conductors fuse together at the faulty place. In both cases the distribution of current at the section ends will be greatly altered. In the case of the two conductors fusing together, for instance, the two transformers will act in separate circuits, almost short circuited at the faulty place and thus alter the current ratio at the ends, as their ratio of transformation differs from the ratio of impedance of the two conductor branches. By this means the relays 5 and 5' are both operated in every case of a fault occurring. Their windings, normally dead, become energized and cause a tripping current to flow through coils 18, 18' which in turn cause the switches 7 and 7' to be thrown out for instance by the means shown.

In the figures the connections and diagram for one phase of a power transmission is shown. The same applies to every other phase, as the phases are quite independent of each other with respect to the safety system.

The transformers are preferably so constructed as to be magnetically saturated even at a relatively small working current, in order to ensure the voltage 12 not to exceed a certain limit, even at great overloads.

Having now described my invention, what I claim as new and desire to secure by Letters Patent is:—

1. A safety system for automatically cutting out faulty sections of electric networks, having a sub-divided conductor in each section, a transformer at each end of a section, having its primary winding connected in one branch and its secondary winding in the other branch of the section, so as to effect the megnetization of the transformer in opposite direction, the ratio of transformation of one transformer of a section being smaller and that of the other transformer being greater than the ratio of impedance of the sub-divided conductors.

2. A safety system for automatically cutting out faulty sections of electric networks, having a sub-divided conductor in each section, a magnetically saturated transformer at each end of a section, having its primary winding connected to one branch and its secondary winding in the other branch of the section, so as to effect the magnetization of the transformer in opposite direction, the ratio of transformation of one transformer of a section being smaller and that of the other transformer being greater than the ratio of impedance of the sub-divided conductors.

In testimony whereof I affix my signature.

MARTIN HÖCHSTÄDTER.